Dec. 6, 1966 R. F. WEST 3,289,497
CUTTING AND ABRADING TOOLS, AND METHOD OF FORMING SAME
Filed Aug. 14, 1964 2 Sheets-Sheet 1

INVENTOR.
ROBERT F. WEST
BY Lindsey, Prutzman and Hayes
ATTORNEYS

Dec. 6, 1966    R. F. WEST    3,289,497
CUTTING AND ABRADING TOOLS, AND METHOD OF FORMING SAME
Filed Aug. 14, 1964    2 Sheets-Sheet 2

INVENTOR.
ROBERT F. WEST

BY *Lindsey, Prutzman and Hayes*
ATTORNEYS

United States Patent Office 3,289,497
Patented Dec. 6, 1966

3,289,497
CUTTING AND ABRADING TOOLS, AND
METHOD OF FORMING SAME
Robert F. West, Simsbury, Conn., assignor to The Stanley Works, New Britain, Conn., a corporation of Connecticut
Filed Aug. 14, 1964, Ser. No. 389,712
8 Claims. (Cl. 76—24)

This invention relates to cutting and abrading tools and, more particularly, to such tools of the type made from sheet metal and having an integral cutting element formed therein for engagement with a workpiece. The invention also includes a new and improved method of producing the cutting elements of such tools.

It is an object of the present invention to provide a new and improved method of producing cutting tools possessing a unitary body and tooth construction wherein the teeth terminate in keen, knife-sharp cutting edges and have rake surfaces free of surface decarburization, thus possessing full hardness in their finished cutting edges.

Another object of the present invention is to provide a method of producing such tools utilizing inexpensive, mass production processing techniques, which method possesses the ability to vary as desired the critical cutting angles defined by the cutting elements.

A further object of this invention is to provide a new and improved method of producing cutting and abrading tools which is capable of rapidly producing at low cost sharpened cutting teeth of high quality and extended useful life.

An additional object is to provide a new and improved tool of the type referred to having an improved tooth structure as a result of the practice of the method of the present invention.

Other objects will be in part obvious and in part pointed out more in detail hereinafter.

The invention accordingly comprises the several steps and the relation of one or more of such steps with respect to each of the others and the article possessing the features, properties, and the relation of elements, which are exemplified in the following detailed disclosure, and the scope of the application of which will be indicated in the claims.

In summary, the cutting and abrading tool, which according to the present invention may be produced as a file, rasp, band, disc, drum or plane, is formed by initially lancing or forming tabs from a strip of sheet metal in such a manner that at least a portion of the tabs protrude above the top surface of the sheet. The protruding tabs are then smoothly ground so as to remove a top portion thereof while producing a leading top edge or cutting edge and a ground tab surface. Subsequent to the grinding operation the tabs are reversely bent so that the newly formed leading edges are caused to pass through the plane of the sheet and fall below the lower riding surface thereof. At the same time the ground tab surface is positioned as a breast or rake surface which, due to its smoothly refined characteristics which include freedom from surface decarburization, improves the wear, life and cutting ability of the resultant cutting element. The thus formed tooth may be utilized effectively at this stage of its manufacture although preferably it is subject to an additional grinding and forming operation as described more fully hereinafter.

Figure 1:
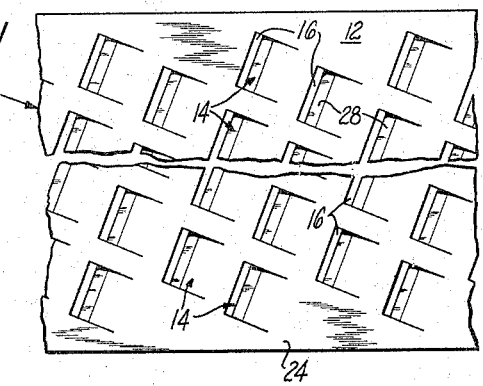
FIG. 1 is a partial plan view of a tool blade of the present invention.

Referring now to the invention in greater detail and with respect to the drawing, FIG. 1 shows a portion of a finished cutting tool blade 10 made in accordance with the invention which comprises a blade body 12 containing a plurality of cutting elements or teeth 14, arranged in rows inclined at an angle to the normal cutting direction of the tool which, as viewed in FIG. 1, is from right to left. Each tooth 14 is preceded by an aperture or clearance hole 16, and the teeth 14 are preferably in staggered relationship. The size and shape of the clearance holes 16 may be varied according to the intended purpose of the tool and the final tooth design desired.

For use in connection with soft metals, it is preferred that the blade be formed from a strip of steel having a thickness in the order of .01 to .05 inch while in tools intended for use with harder material, a thicker sheet steel may be required. A hand tool such as a file will generally require a rectangular piece of strip steel having a width of about ½ to 3 inches and a length of approximately 5 inches or more. For optimium results, it is preferred that the openings 16 be rectangular in shape, as best shown in FIG. 1 and of a sufficient size to provide the desired chip clearance after the final tooth form is produced. At the same time the size of the openings should be kept to a minimum for maximum stiffness of the blade. The number of holes 16 as well as the spacing thereof will depend upon the number and location of the teeth desired.

Figure 2:
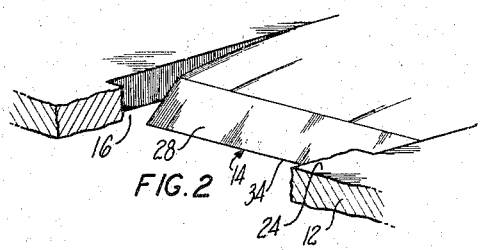
FIG. 2 is a perspective view, partially broken away, of an embodiment of a single cutting tooth of the blade of FIG. 1.
Figure 3:
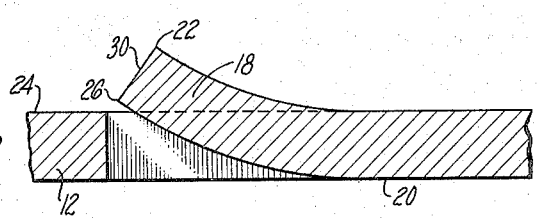
FIGS. 3–7 are longitudinal sectional views through one embodiment of a single cutting tooth illustrating the various steps of its manufacture.

The configuration of the cutting tooth exemplified in FIG. 2 will be more thoroughly appreciated from a consideration of the method of forming the teeth, as illustrated in FIGS. 3–7 of the drawing. The improved cutting tooth 14 is manufactured by initially lancing, as illustrated in FIG. 3, a tab 18 from a flat sheet of metal, such as strip steel. This operation may be conveniently carried out with a pair of dies, not shown, which act against the lower or riding surface 20 of blade body 12, so as to sever the sheet and form a top edge 22 of tab 18 protruding above the upper surface 24 of blade body 12. It is within the purview of the present invention that the forming or bending operation may result in the projection above upper surface 24 of the trailing lanced edge 26 of tab 18, as shown, or in the location of edge 26 at any position between surfaces 20 and 24, as more fully explained hereinafter in connection with FIGS. 8–12. The extent of the initial forming operation is interrelated with the subsequent steps of the method in determining the final rake, included and clearance angles. When a large included angle is desired, it may be preferable to punch an initial clearance hole in blade body 12 thereby ensuring a cleavage of the tab 18 from the blade body. However, it is an advantage of the present invention that such initial hole formation is generally not required thus permitting a more compact arrangement of the rows of cutting teeth.

Figure 4:
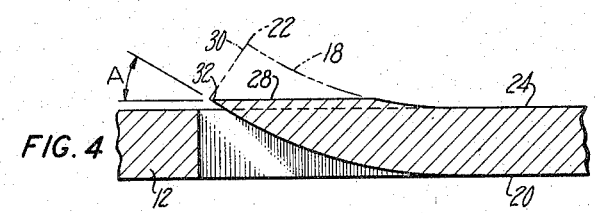

Following the lancing operation, the portion of tab 18 projecting above top surface 24 is removed by smoothly abrading or grinding the tab sufficiently to remove the entire sheared edge 22 of the lanced tab 18. At the same time the abrading produces a smooth, fine-grained tab surface 28 which subsequently acts as the front or rake face of the cutting tooth 14. As illustrated in FIG. 4, the grinding is preferably along a plane generally parallel to upper surface 24 of blade body 12 and removes the leading face 30 of tab 18 thereby providing a new leading top edge 32 which subsequently may be used as a cutting edge.

The extent to which tab 18 is ground will vary depending on the final tooth form desired and the subsequent steps to be performed in obtaining that form. For example, the comminution could result in the surface 28 being flush or essentially coplanar with upper surface 24 thereby removing all of leading face 30 of tab 18, as shown in FIG. 4. The extent of grinding is sufficient so long as it produces the smooth tab face 28 and the leading top edge 32. The included angle A provided by the grinding operation will vary depending on the degree of bending in forming the tab 18 as well as the subsequent forming and grinding operations, as described more fully hereinafter.

Figure 5:
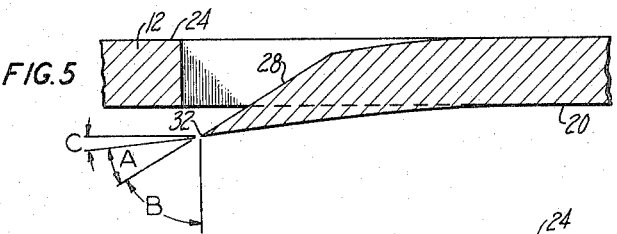
Figure 6:
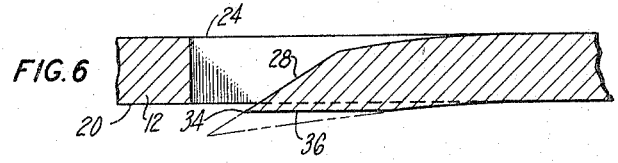

Subsequent to the removal of a portion of tab 18 so as to form surface 28 and edge 32, the tab is reversely formed or bent downwardly through the plane of blade body 12 and preferably to an extent sufficient to cause the leading top edge 32 to fall below riding surface 20 of blade body 12. After appropriate heat treatment, the tooth thus formed may be used effectively at this stage of the process for cutting purposes since leading edge 32 may readily function as a cutting edge and the reverse bending can establish a rake angle B and a clearance angle C of an initial cutting element, as indicated in FIG. 5. As stated above, those angles are interrelated with the included angle formed by the grinding operation and will vary depending upon the materials to be cut. For instance, wood, plastic and materials of related hardness are best cut with tools having a rake angle of 20 to 45 degrees and a clearance angle of 15 to 20 degrees. For cutting materials in the hardness range of soft steel or gray iron it is desirable to use a rake of 0 to 15 degrees and a clearance angle of 10 to 15 degrees while materials of intermediate hardness, such as softer metals, e.g., nonferrous metals, require a rake of about 15 to 40 degrees and a clearance angle of 10 to 15 degrees.

Although the cutting element may be beneficially utilized at this stage in the process of manufacture, it is preferably subjected to subsequent process steps. Where such subsequent operations are to be performed, the extent of reverse bending is critical since it will determine the size of the final included angle which, as stated above, has a definite relationship to the rake and clearance angles and consequently to the end use of the tool. It is an advantage of the invention that the forming of a tooth having a greater included angle not only provides a stronger and more rugged tooth form but also permits a minimum final rake angle and vice versa. Accordingly, when the tool is intended for use with soft materials such as wood, the cutting tooth may be given an included angle of the order of 30 degrees which provides a sufficiently rugged tooth structure for this use while at the same time permitting a relatively large rake angle. On the other hand, if the tool is for use on relatively hard material, the included angle may be increased to as much as 80 degrees which greatly increases the tooth strength and at the same time permits the formation of a rake angle of the order of 0 to 10 degrees.

The cutting element, now possessing the smooth surface 28 and leading top edge or cutting edge 32, preferably undergoes an additional abrading or grinding operation so as to remove a minor amount of that portion of the tooth which extends below riding surface 20. While the extended portion may be completely removed, it is an advantage of the present invention that the abrading need not be carried to that extent to provide a new and keener knife edge 34 defined by the convergence of surface 28 and the newly ground clearance surface 36.

Figure 7:
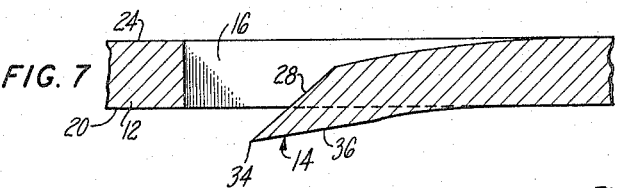

As illustrated in FIG. 7, tooth 14 possessing the knife-sharp edge 34 is next subjected to a further downward bending or forming operation thereby defining the size of clearance hole 16 while setting the final clearance and rake angles. Those angles will, of course, vary depending upon the material to be cut by the tooth, as set forth above. Additionally, the final bending operation sets the depth of cut or distance of knife edge 34 below the riding surface 20, as well as the rake and clearance angles.

Figure 8:
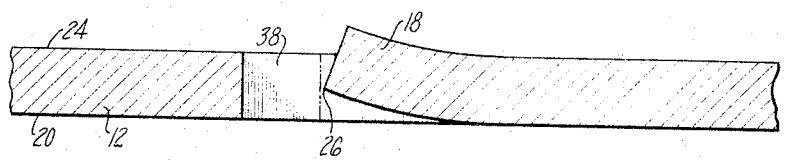
FIGS. 8–12 are longitudinal sectional views through another embodiment of a single cutting tooth illustrating the process of the present invention.

Referring now to FIGS. 8–12 there is illustrated a further embodiment or variation in the method of the present invention. According to that variation the initial forming operation, shown in FIG. 8, is undertaken after an initial hole 38, similar to the final clearance hole, has been made. The hole 38 is preferably made in order to insure severance of tab 18 from blade body 12 and is utilized primarily when trailing edge 26 of tab 18 is permitted to remain intermediate surfaces 20 and 24. The initial hole 38 may be made by means of a punch press of conventional design or by other suitable means which completely remove a portion of the sheet material from the body 12. The punch press can operate from either the top or bottom surface but preferably acts initially on the upper surface 24 so as to provide a clearance hole having sharp edges at the lower or riding surface 20. After the initial aperture 38 is formed, the tab 18 is bent or formed upwardly so that trailing edge 26 is disposed intermediate surfaces 20 and 24.

Figure 9:
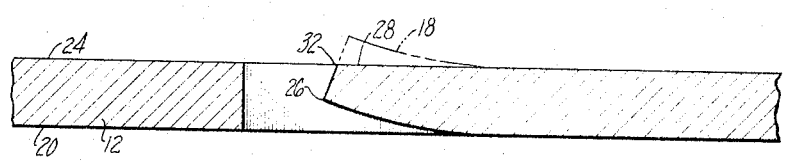
Figure 10:
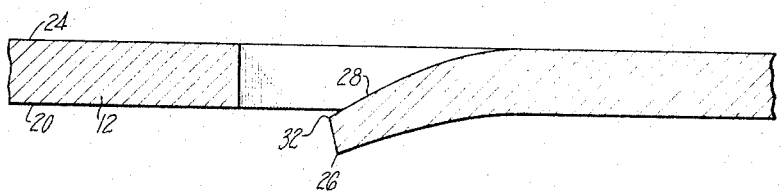
Figure 11:
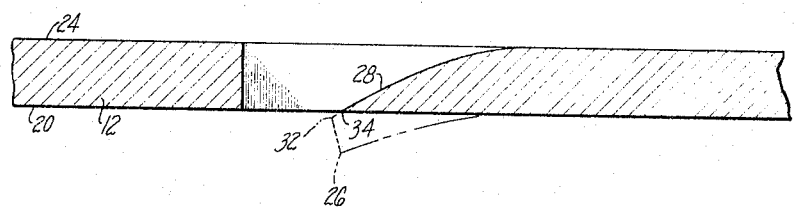
Figure 12:
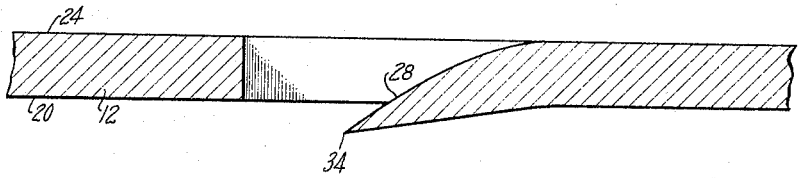

The grinding operation illustrated in FIG. 9 is equivalent in operation and result to that shown in FIG. 4 in that the projecting portion of tab 18 is removed resulting in a smooth, fine-grained tab surface 28 and a new leading top edge 32. The grinding is illustrated as being in a plane parallel to surface 24 and is carried to the extent desired. As shown in FIG. 9 the grinding may be such that surface 28 is essentially coplanar with top surface 24. However, unlike the embodiment of FIGS. 3–7, the tooth is not used as a cutting element after the subsequent step of reverse bending through the plane of the sheet. Rather, it is subjected to the further grinding and forming operations illustrated in FIGS. 11 and 12 so as to produce the knife-sharp edge 34 and set the proper rake and clearance angles.

The cutting teeth resulting from the above processes may be subsequently treated to obtain the desired hardness after the blade strip has been cut to the finished length. Thereafter hooks may be attached to each end for engagement with a holder and a final blade finish may be applied to give to the end product its desired appearance.

The hardness required may be produced according to standard methods known in the art since the surface decarburization normally present on the surfaces of cold rolled strip, has been removed by the grinding operation. Therefore a tool steel containing sufficient carbon to be self-hardening may produce the required hardness by heating the formed blade in a nonoxidizing atmosphere controlled furnace from which it is quenched directly, then tempered. The temperatures and times required will, according to common knowledge in the art, be related to the carbon content and thickness of the blade steel. The resulting cutting teeth will have the required hardness and toughness for long life. Another method which has been found to give good results is the cyanide hardening or nitriding which includes the steps of heating the formed blade for about 3 minutes in a cyanide bath at about 1525° F., quenching in oil and subsequently tempering for approximately 30 minutes at about 400° F.

It will be appreciated by those skilled in the art that the ideal cutting tool is one in which both the rake and clearance faces are smoothly ground, as is the case with conventional plane irons or wood chisels. In order to accomplish this, it had previously been required that the cutting tooth be separated from the base material so that it could be properly ground and subsequently installed in the cutting tool. Now, according to the present invention, it is possible to approach the ideal cutting element in both single and multiple tooth cutting blades wherein the blade body and the cutting tooth are integral and formed from a single unitary sheet material with the tooth extending outwardly from the riding plane of the blade body. Further, the cutting ability of the tool is substantially enhanced by the use of a blade having a smoothly refined rake face possessing a low coefficient of friction and a sharp knife edge.

For convenience and brevity of description, the tool has been described specifically in connection with a tool containing a plurality of cutting elements and intended for hand operation in the filing of materials in the hardness range of plastics and soft metals, although as will be apparent from the foregoing description, the tool may be produced in other forms and for use in connection with other materials.

As will be apparent to persons skilled in the art, various modifications and adaptations of the structure above described will become readily apparent without departure from the spirit and scope of the invention, the scope of which is defined in the appended claims.

I claim:

1. A method of producing a cutting and abrading tool in which each cutting tooth is integral with the blade body of the tool and extends below the riding surface thereof comprising the steps of forming upwardly for each cutting tooth a portion of a metal sheet thereby providing a free tab having at least a portion of a leading face disposed above the top surface of the sheet; grinding the protruding portion of each tab thereby removing at least a portion thereof and providing a smooth ground surface on said tab as well as a leading top edge; and reversely forming the ground tab downwardly through the plane of the metal sheet to the extent that said leading top edge falls below the bottom riding surface of the sheet, whereby said ground surface forms a rake face for each cutting tooth.

2. A method of producing a cutting and abrading tool in which each cutting tooth is integral with the blade body of the tool and extends below the riding surface thereof comprising the steps of forming upwardly portions of a metal sheet to provide a plurality of free tabs, each of said tabs having at least a portion of a leading face disposed above the top surface of the sheet; grinding the protruding tabs along a plane parallel to the top surface of said sheet thereby removing at least a portion thereof and providing a smooth ground surface on said tabs as well as a leading top edge; and reversely bending the ground tab downwardly through the plane of the metal sheet to the extent that the leading edge falls below the bottom riding surface of the sheet whereby said ground surface forms a rake face for each cutting tooth.

3. A method of producing a cutting and abrading tool in which each cutting tool is integral with the blade of the tool and extends below the riding surface of the blade comprising the steps of forming upwardly for each cutting tooth a portion of a metal sheet to provide an initial tab having at least a portion of a leading face disposed above the top surface of the sheet; grinding the protruding portion of each tab thereby removing at least a portion thereof and providing a smooth ground surface on said tab as well as a leading top edge; reversely forming the ground tab downwardly through the plane of the metal sheet to the extent that the leading edge falls below the bottom riding surface of the sheet whereby said ground surface forms a rake face for each cutting tooth; and further grinding the reversely bent tab to provide a keen knife edge and a predetermined included angle.

4. A method of producing a cutting and abrading tool in which each cutting tooth is integral with the blade of the tool and extends below the riding surface of the blade comprising the steps of forming upwardly portions of a metal sheet to provide a plurality of tabs, each of said tabs having at least a portion of a leading face disposed above the top surface of the sheet; grinding the protruding tabs in a plane parallel to the top surface of said sheet thereby removing at least a portion thereof and providing a smooth ground surface on said tabs and a leading top edge; reversely bending the ground tab downwardly through the plane of the metal sheet to the extent that the leading top edge falls below the bottom riding surface of the sheet; and further grinding and blending downwardly the reversely bent ground tab thereby finally positioning said ground surface and setting the desired rake and clearance angles.

5. A method of producing a cutting and abrading tool in which each cutting tooth is integral with the blade of the tool and extends below the riding surface of the blade comprising the steps of forming upwardly portions of a metal sheet to provide a plurality of tabs arranged in successive rows extending transversely of the cutting direction of the tool, each of said tabs having at least a portion of a leading face disposed above the top surface of the sheet; grinding the protruding tabs in a plane parallel to the top surface of said sheet thereby removing at least a portion thereof and providing a first smooth ground surface on said tabs and a leading top edge; reversely bending the ground tab downwardly through the plane of the metal sheet to the extent that the leading top edge falls below the bottom riding surface of the sheet; further grinding the reversely bent ground tab in a plane parallel to said bottom riding surface to provide a keen knife edge and a predetermined included angle; and thereafter bending downwardly said keen knife edge to project below said bottom riding surface thereby positioning said first smooth ground surface as a rake face and setting the desired rake and clearance angles.

6. A method of producing a cutting and abrading tool in which each cutting tooth is integral with the blade of the tool and extends below the riding surface of the blade comprising the steps of punching a plurality of holes in a metal sheet; forming upwardly the portions of the sheet immediately rearwardly of the holes to provide tabs, each of said tabs having at least a portion of a leading face disposed above the top surface of the sheet; grinding the protruding tabs in a plane parallel to the top surface of said sheet thereby removing at least a portion of said leading face and providing a smoothly refined surface on said tabs as well as a leading top edge; reversely bending the ground tab downwardly through the plane of the metal sheet to the extent that the leading top edge falls below the bottom riding surface of the sheet whereby said refined surface forms a rake face for each cutting tooth; and further grinding the reversely bent ground tab to provide a keen knife edge and a predetermined included angle.

7. A method of producing a cutting and abrading tool in which each cutting tooth is integral with the blade of the tool and extends below the riding surface of the blade comprising the steps of punching a plurality of holes in a metal sheet; bending upwardly the portions of the sheet immediately rearwardly of the holes to provide tabs, each of said tabs having at least a portion of a leading face disposed above the top surface of the sheet; grinding the protruding tabs in a plane parallel to the top surface of said sheet thereby removing at least a portion thereof and providing a smooth ground surface on said tabs and leading top edge; reversely bending the ground tab downwardly through the plane of the metal sheet to the extent that the leading top edge falls below the bottom riding surface of the sheet; and further grinding and bending downwardly the reversely bent ground tab thereby finally positioning said ground surface and setting the desired rake and clearance angles.

8. A method of producing a cutting and abrading tool in which each cutting tooth is integral with the blade of the tool and extends below the riding surface of the blade comprising the steps of punching a plurality of rectangular holes in a metal sheet with the holes arranged in successive rows extending transversely of the cutting direction of the tool; bending upwardly the portions of the sheet immediately rearwardly of the holes to provide tabs, each of said tabs having at least a portion of a leading face disposed above the top surface of the sheet; grinding the protruding tabs in a plane parallel to the top surface of said sheet thereby removing at least a portion thereof and providing a first smooth ground surface on said tabs and leading top edge; reversely bending the ground tab downwardly through the plane of the metal sheet to the extent that the leading top edge falls below the bottom riding surface of the sheet, further grinding the reversely bend ground tab in a plane parallel to said bottom riding surface to provide a keen knife edge and a predetermined included angle; and thereafter bending downwardly said keen knife edge to project below said bottom riding surface thereby positioning said first smooth ground surface as the rake face and setting the desired rake and clearance angles.

References Cited by the Examiner

UNITED STATES PATENTS

| | | | |
|---|---|---|---|
| 2,678,571 | 5/1954 | Booth | 76—24 |
| 2,708,376 | 5/1955 | Booth | 76—24 |
| 2,984,892 | 5/1961 | Oxford | 76—24 X |
| 3,077,127 | 2/1963 | Stutzke | 76—24 |
| 3,174,363 | 3/1965 | Strager | 76—24 |

WILLIAM W. DYER, JR., *Primary Examiner.*

HARRISON L. HINSON, *Examiner.*